Figure 6:
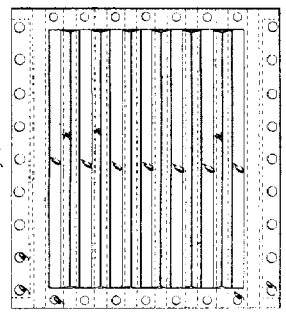

F. B. Stevens.
Steam-Boiler Condenser.
N° 33,857. Patented Dec. 3, 1861.
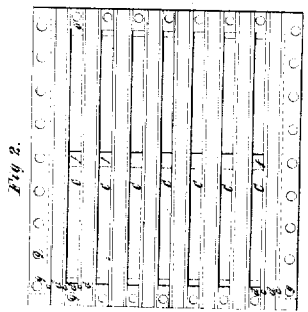
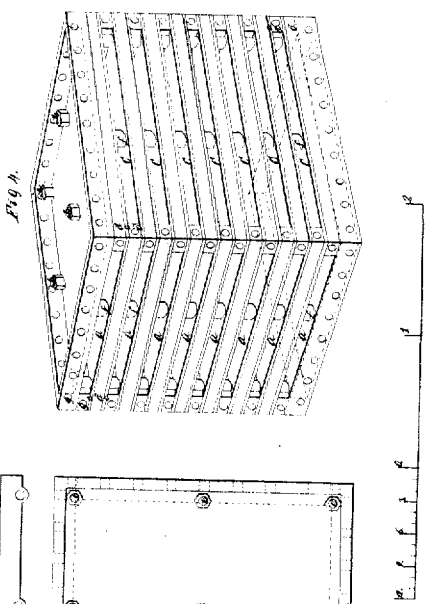
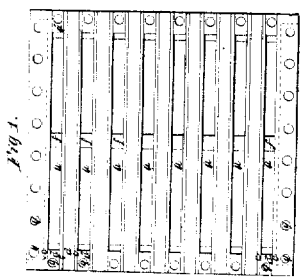
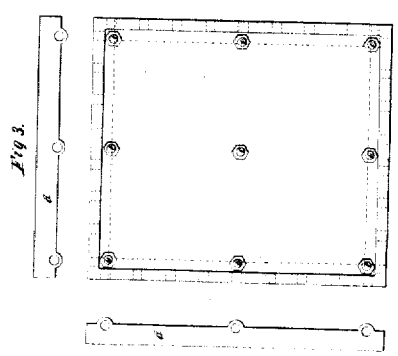
Witnesses: Inventor:

F. B. Stevens,
Steam-Boiler Condenser.

N° 33,357. Patented Dec. 3, 1861.

Witnesses.

Inventor
Francis B. Stevens

F. B. Stevens,
Steam-Boiler Condenser.
N° 33,857.
Patented Dec. 3, 1861.
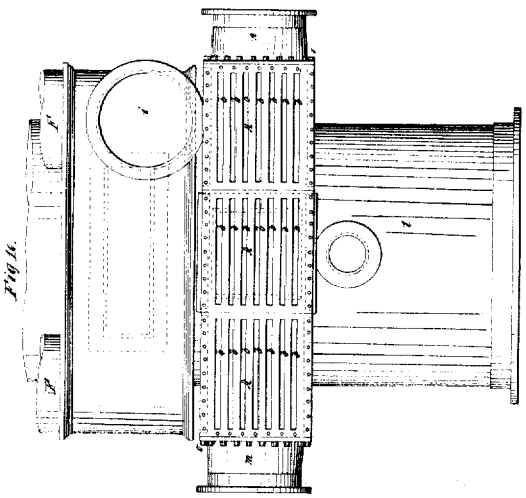
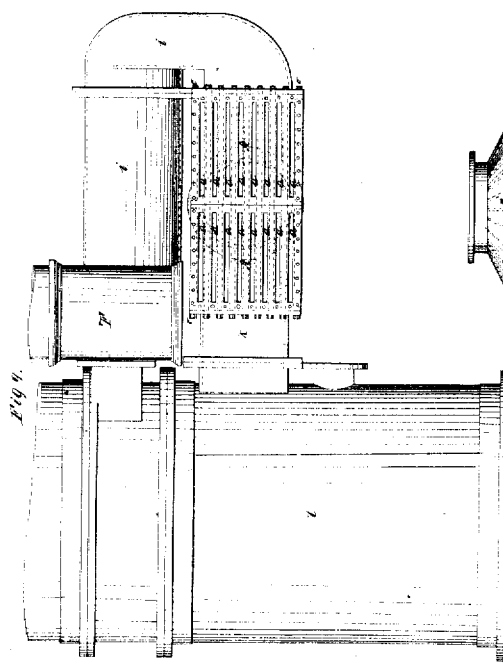
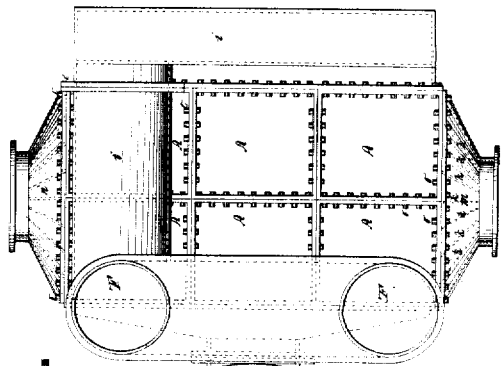
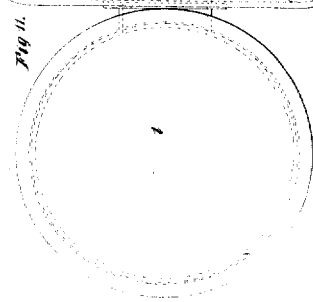
Witnesses.
Inventor.

F. B. Stevens,
Steam-Boiler Condenser.
N°. 33,857.  Patented Dec. 3, 1861.
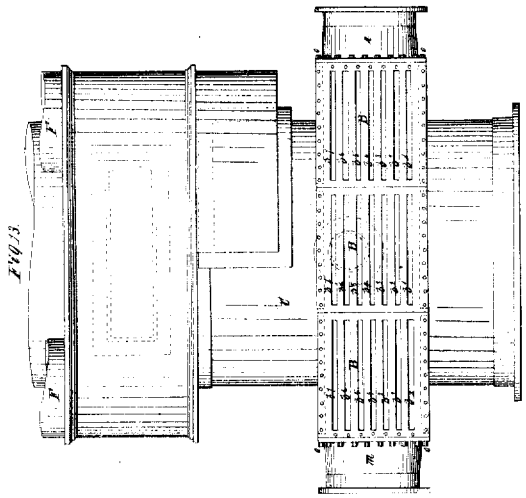
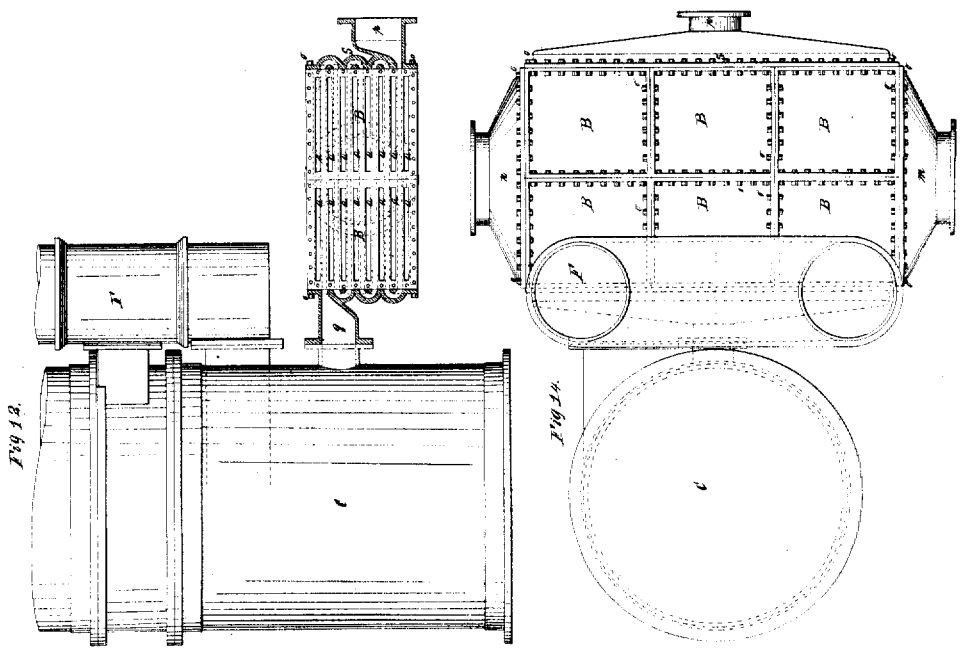
Witnesses.  Inventor.

F. B. Stevens,
Steam-Boiler Condenser.
No. 33,857.
5 Sheets—Sheet 5.
Patented Dec. 3, 1861.
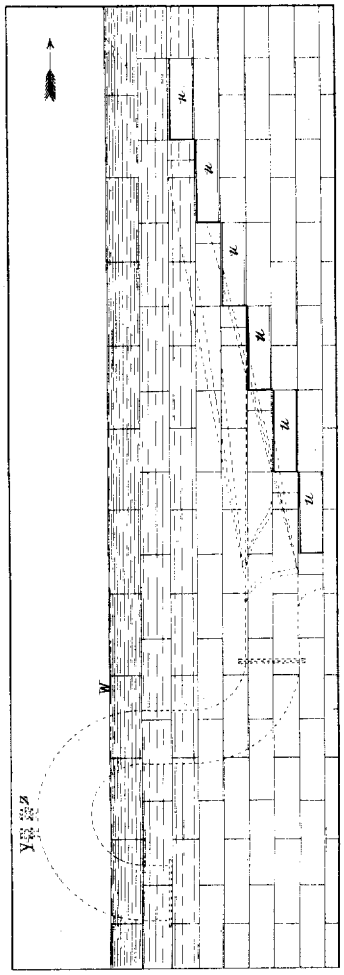
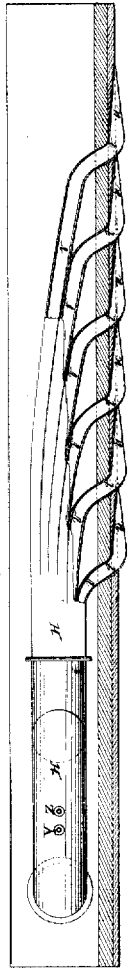
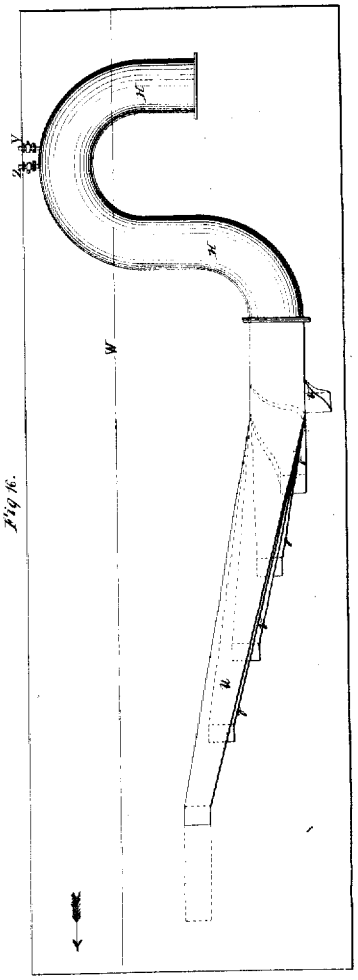
Witnesses
Inventor

UNITED STATES PATENT OFFICE.

FRANCIS B. STEVENS, OF WEEHAWKEN, NEW JERSEY.

IMPROVED CONDENSER FOR STEAM-ENGINES.

Specification forming part of Letters Patent No. 33,857, dated December 3, 1861.

*To all whom it may concern:*

Be it known that I, FRANCIS B. STEVENS, of Weehawken, in the county of Hudson and State of New Jersey, have invented a new and useful Improvement in the Condensers and Condensing Apparatus of Steam-Engines; and I do hereby declare that the following is a full and exact description thereof, reference being had to the accompanying drawings, and to the letters of reference marked thereon.

My improvement relates to those steam-engines in which the water that has been condensed is returned again in the same state to the boiler without mixing with other water more impure than itself.

This improvement is applicable to the well-known surface-condenser in which the steam is condensed by contact with a metallic surface kept cool on the reverse side by the application of cold water, and in which the water after its condensation from steam is returned to the boiler without mixing with the water that cools it. It is also applicable to the cooler or cooling apparatus patented by William Symington in England, A. D. 1835, in which the water that remains to be delivered from the hot well (after a sufficient quantity has been taken for feeding the boiler) is cooled by contact with a metallic surface kept cool by the application of cold water on the reverse side, and which, after being thus cooled, is reinjected into the condenser.

My improvement consists, first, in forming the condenser or cooler in a series of parallel rectangular passages by plates of cast-iron, the water to be cooled or the steam to be condensed being made to pass through certain of the passages, while the cooling-water is made to pass through the others in a current at right angles to the current of the water to be cooled or of the steam to be condensed and on the reverse side of the surface. As these passages have throughout a uniform section, the velocity of the water against the surface must be uniform at all points, so that no portion of the surface will be rendered less efficacious by the water or steam remaining wholly or partially stagnant against it, and these passages can be so proportioned by increasing or by diminishing their width that a given quantity of water may be made to pass through them at any required velocity, for I have found by experiment that the same quantity of surface is more efficacious when the motion of the water is uniform against all its portions, and also that the surface is more efficacious when the velocity of the water against the surface is increased. This velocity I would make as great as can be obtained without inconvenience. I would not have it less than one hundred and fifty feet a minute, and would have it, if not inconvenient, six hundred and fifty feet and upward a minute. I have also found by experiment where the cooling-water and water to be cooled have a velocity of from one hundred and fifty to six hundred and fifty feet and upward a minute that copper, brass, wrought-iron, lead, or cast-iron surfaces, all produce the same cooling effect, or very nearly the same, for a given amount of surface, and also that the thickness of the metal within reasonable limits—say up to the limit of three or four times as thick—has little or no influence upon the effect produced by a given amount of surface. Now for the reason that cast-iron and lead are durable materials, and also for the reason that the same feed-water passing and repassing over the same surface of cast-iron or lead is not injurious to the boiler, I prefer cast-iron or lead to all other metals, and form my condenser of either of those materials. In using lead I would stiffen it by a little antimony.

My improvement consists, secondly, in reversing the current of the water to be cooled and in making it pass successively through two or more of the rectangular passages, for it is necessary that the quantity of cooling-water should be much greater than the quantity to be cooled. Supposing that the quantity of cooling-water to be used is eight times that to be cooled and that the velocity of the water is to be kept the same in each case, then I allow the cooling-water to enter and flow through eight passages simultaneously, while the water to be cooled enters and flows through but one, and then is made to flow successively through the other seven.

My improvement consists, thirdly, in placing guide-plates in the pipes that convey water to the rectangular passages in such manner that the water may be conducted into each passage in equal quantity or in nearly equal quantity.

My improvement consists, fourthly, in forming a wedge or bow piece between every two apertures for the purpose of deflecting the water into the apertures, and for the purpose of preventing the water from being impeded by striking against a flat surface between the two apertures. The condenser or cooler, when applied to a steamship, has been supplied with cooling-water without the intervention of a pump by means of a pipe leading from the outside of the vessel to the condenser or cooler and again from the condenser or cooler to the outside of the vessel, the water thus moving in a closed circuit, the motion through the circuit being generated by the motion of the vessel.

Now, as I use a great quantity of cooling-water, my improvement consists, fifthly, in making the water enter the vessel by means of two or more apertures arranged in a series one under the other, but at such distance the one behind the other that the strength of the vessel or ship shall not be unduly impaired, the water leaving the vessel by the same number of apertures arranged in a similar manner. I slope the side or part of the ship or vessel directly in front of these apertures, gradually sinking the surface until it meets the apertures, so that the water from the outside may be more readily deflected into these apertures and into the pipe or pipes leading to the condenser or cooler.

My improvement consists, sixthly, in turning the pipe that conducts the cooling-water from the outside of the vessel to the condenser or cooler, and again from the condenser or cooler to the outside of the vessel upward, both as it enters and leaves the vessel, so that a portion of it may be above the water-line on both sides of the condenser or cooler, and thus that the condenser or cooler, although placed below the water-line, may be at all times accessible without the interposition of a valve or cock to shut off the water from the outside of the vessel. When the velocity of the water through the pipe is not sufficient to overcome the head caused by these bends and to establish the circuit, (though if the circuit is once established it will continue to flow,) I place a small pipe with a cock in it connecting the pipe at its highest elevation with the interior of the condenser to start the current of the cooling-water. I also place another small cock by the side of the first, communicating with the atmosphere for the purpose of preventing the flow of water into the vessel while the joint between the condenser or cooler and the main pipe is broken.

I will now proceed to describe my invention by a reference to drawings.

Figure 1 is a drawing of a side elevation of my condenser or cooler, formed by separate plates of cast-iron bolted together. Fig. 2 is a front elevation of the same. Fig. 3 is a horizontal view of the same. Fig. 4 is a perspective view of the same. $a\,a\,a$ are the apertures of the rectangular passages for the cooling-water. $b\,b\,b$ are the apertures of the rectangular passages for the steam to be condensed or water to be cooled. $c\,c\,c$ are the cast-iron plates forming the surface. $d\,d\,d$ are pieces placed between the plates to keep them the requisite distance apart. $e\,e\,e$ are bolts securing the plates together. $f\,f\,f$ are thimbles placed between the plates, through which the bolts $e\,e\,e$ pass. $g\,g\,g$ are holes for the purpose of attaching one or more similar condensers to this one or for the purpose of attaching the pipe conveying the water or steam to it.

Figure 8:
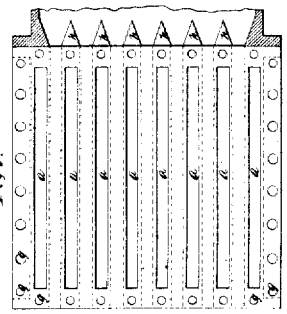
Figure 7:
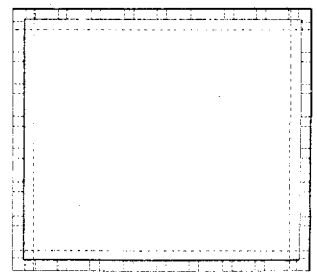

Fig. 5 is a side elevation of the same condenser shown at Fig. 1, but formed by being cast together in one piece. Fig. 6 is a front elevation of the condenser shown at Fig. 5. Fig. 7 is a horizontal view of the condenser shown at Fig. 5. Fig. 8 is a perspective view of the condenser shown at Fig. 5. $h\,h\,h$ are wedge or deflecting pieces for the purpose of deflecting water into the passages. The other letters of reference are the same as before given in Figs. 1, 2, 3, and 4, excepting that the letters $d$, $e$, and $f$ are omitted.

Figure 9:
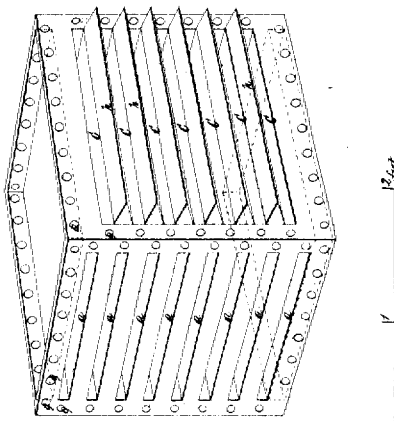

Fig. 9 is a side elevation of six of the castings shown at Fig. 5, combined and attached together and placed between the side pipes and the ordinary condenser of a steam-engine, and forming an external condenser for it. Fig. 10 is a front elevation of Fig. 9. Fig. 11 is a horizontal view of Fig. 9. A A A show six of the castings shown at Fig. 5, attached together and forming an external condenser. $a\,a\,a$ are the apertures of the rectangular passages for the cooling-water. $b\,b\,b$ are the apertures of the rectangular passages for the steam to be condensed. $i$ is a pipe leading from the side pipes to the external condenser. $k$ is a pipe leading from the external condenser to the ordinary condenser $l$. $m$ and $n$ are the two nozzles that are attached to the external condenser by the screw-bolts $o\,o\,o$ for the purpose of leading the cooling-water to and from the condenser. K K K are dotted lines, showing the guide-plates for conducting the water in equal quantities to the passages. $o\,o$ are the screw-bolts that attach the six castings forming the external condenser together and that attach the nozzles $m$ and $n$ to this condenser. I I are the side pieces of the steam-engine.

Fig. 12 is a side elevation of the application of six of the castings shown at Fig. 5, combined and attached together and placed between the hot well and the ordinary condenser of a steam-engine and forming a cooler for the purpose of cooling the water from the hot-well, so that it may be injected into the ordinary condenser to condense the steam. Fig. 13 is a front elevation of Fig. 12. Fig. 14 is a horizontal view of Figs. 12 and 13. B B B are six of the castings shown at Fig. 5, attached together and forming the cooler. $a\,a\,a$ are the apertures of the rectangular passages for the cooling-water. $b'$ $b^2$ $b^3$ $b^4$ $b^5$ $b^6$ $b^7$ are the apertures of the rectangular passages for the water to be cooled. $p$ is a pipe and nozzle connecting with the pipe that leads from the hot well to the cooler. $q$ is a pipe and nozzle connecting the cooler with the ordinary condenser. $m$ and $n$ are two nozzles attached to the cooler by the screw-bolts $o$ $o$ for the purpose of leading the cooling-water to and from the cooler. $o$ $o$ are screw-bolts that attach the six castings forming the cooler together and that attach the nozzles $m$ and $n$ to this cooler. I I are the side pipes of the steam-engine. The cooling-water enters the cooler by the nozzle $m$ and passes through the rectangular passages, (shown at $a$ $a$ $a$,) and leaves the cooler by the nozzle $n$, while the water from the hot well to be cooled enters the cooler by the nozzle $p$ and by the aperture $b'$ of the horizontal passage. (Shown on the front elevation, Fig. 13.) This aperture is also shown by dotted lines in the side elevation, Fig. 12, and after passing through this rectangular passage $b'$ in a current at right angles to the current of the cooling-water is reversed by the cap-piece $r$ and is turned into the aperture of the passage $b^2$, and after passing through this passage is turned by the cap-piece S into the aperture $b^3$, and from $b^3$ is turned by the cap-piece $r$ to $b^4$, and so on, at each end of the cooler until it reaches the aperture $b^7$, from which it is led by the pipe and nozzle $q$ to the ordinary condenser. The front elevation, Fig. 13, shows the cap-piece S removed, so that the apertures of the passage $b'$ $b^2$, &c., may be visible, and the side elevation of Fig. 12 shows the nozzle $m$ removed, so that the apertures $a$ $a$ $a$ may be visible. The water to be cooled thus enters and passes through one horizontal passage, and then in succession through the others, while the cooling-water enters and passes through the eight apertures $a$ $a$ $a$ at once, so that if the velocity is the same in both cases the cooling-water will be eight times the quantity of the water to be cooled.

Fig. 15 is a side elevation of the outside of the ship of the arrangement of the apertures through the side of the ship for conducting the cooling-water from the outside of the vessel and also the pipes leading from the apertures to the condenser or cooler. Fig. 16 is a side elevation of the same on the inside of the ship. Fig. 17 is a horizontal view and section of Figs. 15 and 16. $t$ $t$ are six apertures for the admission of the cooling-water arranged in a series, each one under the other and each one behind the other. $u$ $u$ are the six sloping recesses that facilitate the passage of the water into the apertures $t$ $t$, each of these sloping recesses being placed in front of the corresponding aperture. $v$ $v$ are six pipes connecting with the main pipe II. This main pipe II leads the water to the condenser or cooler and is deflected above the water-line W. Y is a small cock and pipe leading to the condenser for the purpose of starting the current of the water through the pipe II. Z is a small cock communicating with the atmosphere for preventing the flow of water into the ship when the connection between the pipe II and the condenser or cooler is broken. An arrangement precisely similar to that shown at Figs. 15, 16, and 17 is used to convey the water from the condenser or cooler back again to the outside of the vessel, with the exception that the six sloping recesses $u$ $u$ $u$ are sloped in the opposite direction—that is to say, that each of the sloping recesses is placed astern of its corresponding aperture, so that the water may readily flow out of the pipes $v$ $v$ $v$.

What I claim as my invention is—

1. A condenser or cooler for steam-engines, formed by a series of parallel rectangular passages $b$ $b$ $b$, through which the steam to be condensed or water to be cooled passes, while the current of the cooling-water is made to pass through the passages $a$ $a$ $a$ on the reverse side of the surface and in a current at right angles to the current of the steam to be condensed or water to be cooled, and forming these passages by means of the rectangular metallic plates $c$ $c$ $c$, made separately and bolted together by the bolts $e$ $e$ $e$, or cast together, as shown in Figs. 5, 6, 7, and 8, also two or more of these condensers combined into one by being attached to each other by the screw-bolts $o$ $o$ $o$.

2. Reversing the current of the water to be cooled by means of the cap-pieces $r$ and $s$, so that it may be made to flow in succession through two or more of the rectangular passages $b$ $b$.

3. The guiding-plates K K K as a means of guiding the water into the rectangular passages, so that it may be equally distributed.

4. The deflecting-pieces $h$ $h$ $h$, so arranged as to gently deflect the cooling-water into the rectangular apertures $a$ $a$ $a$.

5. Two or more apertures $t$ $t$ $t$, made through the side of the vessel or ship, in combination with the condenser or cooler, and also, in the same combination, the sloping recesses $u$ $u$.

6. In combination with the condenser or cooler, the pipe II, turned upward as a device to render the condenser or cooler accessible without the intervention of a cock or valve, also the small pipe and cock Y, connecting the pipe at or near the summit of the turn with the interior of the condenser.

FRANCIS B. STEVENS.

Witnesses:
CORNELIUS CREEDON,
JULIUS HORNIG.